US011271198B2

(12) United States Patent
D'Aigle et al.

(10) Patent No.: US 11,271,198 B2
(45) Date of Patent: Mar. 8, 2022

(54) CORE-SHELL ELECTRODE MATERIAL PARTICLES AND THEIR USE IN ELECTROCHEMICAL CELLS

(71) Applicants: HYDRO-QUÉBEC, Montréal (CA); MURATA MANUFACTURING CO., LTD., Nagaokakyo (JP)

(72) Inventors: Jean-Christophe D'Aigle, St-Bruno-de-Montarville (CA); Yuichiro Asakawa, Montréal (CA); Shinichi Uesaka, Westmount (CA); Karim Zaghib, Longueuil (CA); Mélanie Beaupré, Lac-Aux-Sables (CA)

(73) Assignees: HYDRO-QUÉBEC, Québec (CA); MURATA MANUFACTURING CO., LTD., Kyoto (JP)

( * ) Notice: Subject to any disclaimer, the term of this patent is extended or adjusted under 35 U.S.C. 154(b) by 462 days.

(21) Appl. No.: 16/072,242

(22) PCT Filed: Jan. 25, 2017

(86) PCT No.: PCT/CA2017/050075
§ 371 (c)(1),
(2) Date: Jan. 16, 2019

(87) PCT Pub. No.: WO2017/127922
PCT Pub. Date: Aug. 3, 2017

(65) Prior Publication Data
US 2019/0067688 A1    Feb. 28, 2019

Related U.S. Application Data

(60) Provisional application No. 62/286,787, filed on Jan. 25, 2016.

(51) Int. Cl.
*H01M 4/36*     (2006.01)
*H01M 10/0525*  (2010.01)
(Continued)

(52) U.S. Cl.
CPC .......... *H01M 4/366* (2013.01); *C01G 23/005* (2013.01); *C08F 212/08* (2013.01);
(Continued)

(58) Field of Classification Search
CPC ...... H01M 4/36; H01M 10/0525; H01M 2/02; H01M 4/131; H01M 4/485; H01M 4/62;
(Continued)

(56) References Cited

U.S. PATENT DOCUMENTS 9,109,076 B2 *   8/2015  Charpentier ............. C09D 7/68
2012/0007028 A1 * 1/2012  Hwang ................. H01M 4/625
                                                        252/503

(Continued)

FOREIGN PATENT DOCUMENTS

CN      105762334 A       7/2016
JP      2013191539    *   1/2013
(Continued)

OTHER PUBLICATIONS

Krysiak et. al. Synthetic Metals 209 (2015) 150-157 (Year: 2015).*
(Continued)

*Primary Examiner* — Alexander Usyatinsky
(74) *Attorney, Agent, or Firm* — Buchanan Ingersoll & Rooney P.C.

(57) ABSTRACT

This application describes electrode materials and methods of producing them, the materials containing particles having a core-shell structure, wherein the shell of the core-shell particles comprises a polymer, the polymer being grafted on the surface of the core particle by covalent bonds. Electrodes and electrochemical cells containing these electrode materials are also contemplated, as well as their use.

21 Claims, 9 Drawing Sheets

(51) Int. Cl.

| | | |
|---|---|---|
| C08F 292/00 | (2006.01) | |
| H01M 4/62 | (2006.01) | |
| H01M 4/485 | (2010.01) | |
| H01M 4/525 | (2010.01) | |
| C08F 290/06 | (2006.01) | |
| H01M 4/48 | (2010.01) | |
| C08L 51/10 | (2006.01) | |
| C08F 299/00 | (2006.01) | |
| C08F 212/08 | (2006.01) | |
| C08F 285/00 | (2006.01) | |
| H01M 4/58 | (2010.01) | |
| H01M 4/587 | (2010.01) | |
| H01M 4/505 | (2010.01) | |
| H01M 50/109 | (2021.01) | |
| C01G 23/00 | (2006.01) | |
| H01M 4/131 | (2010.01) | |

(52) U.S. Cl.
CPC ........ *C08F 285/00* (2013.01); *C08F 290/062* (2013.01); *C08F 292/00* (2013.01); *C08F 299/00* (2013.01); *C08L 51/10* (2013.01); *H01M 4/131* (2013.01); *H01M 4/48* (2013.01); *H01M 4/485* (2013.01); *H01M 4/505* (2013.01); *H01M 4/525* (2013.01); *H01M 4/58* (2013.01); *H01M 4/587* (2013.01); *H01M 4/623* (2013.01); *H01M 4/625* (2013.01); *H01M 4/628* (2013.01); *H01M 10/0525* (2013.01); *H01M 50/109* (2021.01); *C01P 2002/82* (2013.01); *C01P 2002/88* (2013.01); *C01P 2002/90* (2013.01); *C01P 2004/04* (2013.01); *C01P 2006/40* (2013.01)

(58) Field of Classification Search
CPC .......... H01M 4/58; H01M 4/625; H01M 4/48; H01M 4/525; H01M 4/628; H01M 4/587; H01M 4/366; H01M 4/623; H01M 4/505; H01M 2/0222; C01G 23/00; C01G 23/005; C08F 292/00; C08F 285/00; C08F 299/00; C08F 290/062; C08F 212/08; C08F 230/08; C08F 220/14; C08F 220/06; C08F 212/14; C08F 212/18; C01P 2006/40; C01P 2002/88; C01P 2002/82; C01P 2004/04; C01P 2002/90; Y02E 60/10
See application file for complete search history.

(56) References Cited

U.S. PATENT DOCUMENTS

| | | | |
|---|---|---|---|
| 2013/0337315 A1 | 12/2013 | Yamamoto et al. | |
| 2016/0164081 A1* | 6/2016 | Cui | H01M 4/134 427/58 |

FOREIGN PATENT DOCUMENTS

| | | |
|---|---|---|
| JP | 2013-522820 A | 6/2013 |
| JP | 2013-191539 A | 9/2013 |
| JP | 2014099291 A | 5/2014 |
| WO | 03/100884 A2 | 12/2003 |
| WO | 2015/010524 A1 | 1/2015 |
| WO | 2017/111131 A1 | 6/2017 |

OTHER PUBLICATIONS

Ejaz et al, Journal of Polymer Science Part A, 53, 6 (2015), p. 719-728 (Year: 2015).*
JP2013191539 MT (Year: 2013).*
Ejaz, M. et al."Core-Shell Structured Poly(glycidyl methacrylate)/BaTiO3 Nanocomposites Prepared by Surface-Initiated Atom Transfer Radical Polymerization: A Novel Material for High Energy Density Dielectric Storage" Journal of Polymer Science, Polymer Chemistry, 2015, vol. 53, No. 6, pp. 719-728.
Krysiak, E. et al."Core-shell system based on titanium dioxide with elevated value of dielectric permittivity: Synthesis and characterization" ELSEVIER, Synthetic Metals, 2015, vol. 209, pp. 150-157.
Lacroix-Desmazes, P. et al."Synthesis of Poly(chloromethylstyrene-b-styrene) Block Copolyners by Controlled Free-Radical Polymerization" Journal of polymer Science, Part A, Polymer Chemistry, vol. 38, No. 21, Nov. 1, 2000, pp. 3845-3854.
Puli, V. S. et al."Core-shell like structured barium zirconium titanate-barium calcium titanate-poly(methyl methacrylate) nanocomposites for dielectric energy storage capacitors" ELSEVIER, Polymer, vol. 105, 2016, pp. 35-42.
Nguyen, V. et al."Graft Polymerization of Vinyl Acetate onto Silica" Journal of Applied Polymer Science, vol. 87, 2003, pp. 300-310.
Extended European Search Report dated Aug. 21, 2019 issued by the European Patent Office in corresponding European Application No. 17743517.9-1108, 8 pages.
International Search Report (PCT/ISA/210) dated Mar. 16, 2017, by the Canadian Patent Office as the International Searching Authority for International Application No. PCT/CA2017/050075.
Written Opinion (PCT/ISA/237) dated Mar. 16, 2017, by the Canadian Patent Office as the International Searching Authority for International Application No. PCT/CA2017/050075.
Belharouak, I. et al.,"Performance Degradation and Gassing of Li4Ti5O12/LiMn2O4 Lithium-Ion Cells" Journal of The Electrochemical Society, 2012, vol. 159, No. 8, pp. A1165-A1170.
Wu, K. et al."Investigation on gas generation of Li4Ti5O12/LiNi1/3Co1/3Mn1/3O2 cells at elevated temperature" Journal of Power Sources, 2013, vol. 237, No. 0, pp. 285-290.
Wu, K. et al.:Investigation on Li4Ti5O12 batteries developed for hybrid electric vehicle J Appl Electrochem, 2012, vol. 42, No. 12, pp. 989-995.
Han, L. et al.,"The Analysis and Research on the Coating and Drying Method of Electrode of the Li-Ion Power Battery" Advanced Materials Research, 2013, vol. 765-767, pp. 3184-3187.
Kim, S. Y. et al.,"A Study on Improving Drying Performance of Spinel Type LiMn2O4 as a Cathode Material for Lithium Ion Battery" International Journal of Electrochemical Science, 2011, vol. 6, No. 11, pp. 5462-5469.
Bouayad, H. et al.,"Improvement of Electrode/Electrolyte Interfaces in High-Voltage Spinel Lithium-Ion Batteries by Using Glutaric Anhydride as Electrolyte Additive" J. Phys Chem. C, 2014, vol. 118, No. 9, pp. 4634-4648.
Lu, Q. et al.,"A polyimide ion-conductive protection layer to suppress side reactions on Li4Ti5O12 electrodes at elevated temperature†" RSC Advances, 2014, vol. 4, No. 20, pp. 10280-10283.
Daigle, J.-C. et al.,"A Simple Method for Forming Hybrid Core-Shell Nanoparticles Suspended in Water" Research Article, Hindawi Publishing Corporation, Journal of Nanomaterials, 2008, 8 pages.
Loiseau, J. et al.,"Synthesis and Characterization of Poly(acrylic acid) Produced by RAFT Polymerization. Application as a Very Efficient Dispersant of CaCO3, Kaolin, and TiO2" Macromolecules, 2003, vol. 36, No. 9, pp. 3066-3077.
Bourgeat-Lami, E. et al.,"Poly(ethyl acrylate) latexes encapsulating nanoparticles of silica : 1. Functionalization and dispersion of silica" Polymer, 1995, vol. 36, No. 23, pp. 4385-4389.
Office Action (Notice of Reasons for Rejection) dated Nov. 19, 2020, by the Japanese Patent Office in corresponding Japanese Patent Application No. 2018-538565, and an English Translation of the Office Action. (12 pages).
Office Action (Communication pursuant to Article 94(3) EPC) dated Dec. 10, 2020, by the European Patent Office in corresponding European Application No. 17 743 517.9-1108. (5 pages).

* cited by examiner (a)

(b)

Step 1: Radical Polymerization    Step 2: Modification of the polymer

Step 3: Grafting on LTO surface

Scheme 1

Scheme 2

CORE-SHELL ELECTRODE MATERIAL PARTICLES AND THEIR USE IN ELECTROCHEMICAL CELLS

RELATED APPLICATIONS

This application claims priority to U.S. provisional application No. 62/286,787 filed on Jan. 25, 2016, the contents of which is incorporated herein by reference in its entirety for all purposes.

TECHNICAL FIELD

The technical field generally relates to electrodes materials comprising core-shell particles and their methods of synthesis, for instance, for reducing or preventing electrochemical cells degradation.

BACKGROUND

Water may be present in electrochemical cells, for instance as residual contamination from the cathode. $CO_2$ is produced when degradation of the electrolyte occurs in the presence of water. The degradation takes place during the cycling of the battery. For instance, during the cycling of batteries with a lithium titanium oxide (LTO) or graphite anode, electrolytes including carbonates derivatives can react with residual water, in the presence of the anode, to form $CO_2$, CO, $H_2$, $O_2$ and hydrocarbons. These, mainly gaseous, resulting products are responsible for an inflation of the pouch cell and may lead to security issues (Belharouak, I. et al., International Battery Seminar and Exhibit, 2012, 874-887; Wu, K. et al. *Journal of Power Sources*, 2013, 237 (0), 285-290; Wu, K. et al. *J Appl Electrochem*, 2012, 42 (12), 989-995). It is believed that such a reaction is caused by the presence of acid groups, such as hydroxyl groups on the surface of the active material.

One of the industrial strategies to prevent degradation of electrolytes consists in the removal of water from the cathode and the anode, which include hydrophilic electrode active materials. However, this approach has a high-energy cost (Wu, K. et al., *Advanced Materials Research*, 2013; Vol. 765-767, 3184-3187; Kim, S. Y. et al., *International Journal of Electrochemical Science*, 2011, 6 (11), 5462-5469).

Another strategy consists in the formation of a protective coating at the interface of the electrodes. This coating can prevent the contact between the electrolyte and the active surface of the electrodes. For example, the decomposition of an additive in the electrolyte may form a film (Bouayad, H. et al., *J. Phys. Chem. C*, 2014, 118 (9), 4634-4648). The formation of a shell directly on the active materials, i.e. on the surface of the LTO particles hereafter referred to as active particles, before assembling the cell is an alternative to the above-mentioned conventional methods (Lu, Q. et al., *RSC Advances*, 2014, 4 (20), 10280-10283).

Among studied technologies for producing a protective layer on the LTO particle, absorption of polymer on the particle surface can improve the active material stability in water or organic solvents. This absorption is based on the polymer's affinity with the surface of the active particle, as well as on the particle/solvent, solvent/polymer and polymer/particle interfacial energies (Daigle, J.-C. et al., *Journal of Nanomaterials*, 2008, 8; Loiseau, J. et al., *Macromolecules*, 2003, 36 (9), 3066-3077). In these cases, most of the dispersions are done in water because of the significant difference between interfacial energy (water/particles), which allow for a better stabilisation of the slurry. However, this strategy implies developing specific polymers based on the active material and/or the solvent, which is not very practical. As the absorption is only physical, the coating layer may also not resist mechanical treatment. Since electrode manufacturing methods often involve several mechanical manipulations susceptible to alter the protective layer, absorption of the polymer would be difficult to implement on an industrial scale.

Other methods, including covalent bonding of a polymer to the surface of a particle, generally involve modifying the surface of the particle in order to increase its affinity with the hydrophobic polymer. More specifically, the particle surface must become more "organic" in order to improve polymer and particle coexistence (Bourgeat-Lami, E. et al., *Polymer* 1995, 36 (23), 4385-4389; Nguyen, V. et al. *Journal of Applied Polymer Science* 2003, 87 (2), 300-310). However, a slight modification of the particle can significantly modify its properties.

There is thus a need for an improved method for creating covalent bonds between the particle and the polymer, for example, solving one or more drawbacks associated with previous methods. For instance, by covalently linking the polymer to the surface of the particle, the shell's stability may be improved over mechanical and/or chemicals damages.

SUMMARY

According to one aspect, the present technology relates to an electrode material comprising particles, said particles comprising a core-shell structure wherein:
  the core comprises an electrochemically active material particles having a surface comprising hydroxyl groups; and
  the shell comprises a polymer and covers at least partially the surface;
wherein the polymer is grafted on the surface of the particle by one or more covalent bond(s).

In one embodiment, the polymer is grafted directly on the surface. In another embodiment, the polymer is grafted on the surface through a linker, e.g. a monomer which comprises an organic silicon comprising an ethylene substituent.

In another embodiment, the polymer is based on monomers polymerizable via radical or ionic polymerization. For example, wherein the polymer is based on at least one monomer comprising a halogen group (the halogen group being at least partially replaced by a covalent bond to the hydroxyl groups of the particle), e.g. vinyl benzyl chloride. In one example, the polymer is further based on at least one styrene monomer.

In one embodiment, an additional substituent is partially grafted on the polymer by covalent bonding, said additional substituent improving adhesion of said polymer on said surface of the electrochemically active material. For instance, the additional substituent is 1,8-diazabicyclo [5.4.0]undec-7-ene.

In another embodiment, the polymer is based on at least one monomer selected from styrenes, alkyl acrylates, alkyl methacrylates, alkyl vinyl ethers, acrylic acid, methacrylic acid, and glycols.

In any one of the foregoing embodiments, the polymer represents between about 0.1 wt % and about 10 wt %, or between about 0.3 wt % and about 5 wt %, or between about 0.5 wt % and about 3 wt %, or between about 0.5 wt % and about 2 wt %, of the total weight of the particles. In another embodiment, the polymer represents between about 0.1 wt % and about 10 wt %, or between about 2 wt % and about 7 wt %, or between about 3 wt % and about 5 wt % of the total weight of the particles.

Examples of the electrochemically active material are:

LiM'PO$_4$ wherein M' is Fe, Ni, Mn, Co, or a combination thereof, each of which may be further partially replaced by a doping material, e.g. Zr and the like;

Li(M'$_{1-c}$A$_c$)$_{1-d}$X$_{1-d}$PO$_4$, M' is as defined above, A is Fe, Ni, Mn, or Co and is different from M', and X is a doping material, e.g. Zr, and the like, and c and d are greater than or equal to 0 and lower that 0.25;

LiMn$_2$O$_4$, wherein Mn may be partially replaced, for example, LiMn$_{2-a}$M$_a$O$_4$, wherein M, in this instance, may be selected from Co and Ni, and a is greater than or equal to 0 and lower that 0.5;

LiM"O$_2$, wherein M" is Mn, Co, Ni, or a combination thereof, e.g. LiCo$_{1-b}$M$_b$O$_2$, wherein M, in this instance, may be selected from Mn and Ni, and b is greater than or equal to 0 and lower that 0.25;

Li(NiM''')O$_2$, wherein M''' is Mn, Co, Al, Fe, Cr, Ti, or Zr, and combinations thereof; and vanadium oxides, lithium vanadium oxides (e.g. LiV$_3$O$_8$, V$_2$O$_5$, and the like).

Other examples of the electrochemically active material are:

titanates and lithium titanates such as TiO$_2$ (rutile, bronze, anatase), Li$_2$TiO$_3$, Li$_2$Ti$_5$O$_{12}$, H$_2$Ti$_5$O$_{11}$, H$_2$Ti$_4$O$_9$, or a combination thereof, wherein Ti may be further optionally replaced in-part by a doping element; and Li$_4$Ti$_{5-e}$Z$_e$O$_{12}$, wherein Z is a doping element, for instance, selected from Zr, Ni, Ta, Cr, Co, La, Y, Ru, Mo, Mn, V, Nb, Sr, and the like, e.g. Zr, and e is greater than or equal to 0 and lower that 1.5;

carbon (e.g. graphite (C6), hard carbon, graphene and the like), the carbon can be spherical, midair, needle shaped, and the like, such as carbon black, acetylene black, furnace black, carbon fibers (e.g. VGCF), and the like; and Si, Si—C, SiO$_x$, Sn, SnO$_x$, Si—O—C, Ti—C.

In another aspect, the present technology relates to a method for producing an electrode material herein defined, the method comprising:

providing an electrochemically active material in the form of microparticles or nanoparticles having a surface comprising hydroxyl groups;

providing a polymer for grafting on the surface, said polymer comprising leaving groups displaceable by substitution; and grafting said polymer on the surface of the particle, wherein the polymer is covalently grafted on the surface.

In one embodiment, the method further comprise grafting an additional substituent on the polymer before the grafting of said hydrophobic polymer on the surface, for improving adhesion of said hydrophobic polymer on said surface. For instance, the additional substituent is 1,8-diazabicyclo[5.4.0]undec-7-ene.

For instance, the polymer is based on at least one monomer comprising at least one halogen substituent, e.g. vinyl benzyl chloride monomer. In another embodiment, the polymer is based on at least one monomer polymerizable with the at least one monomer comprising at least one halogen substituent, e.g. at least one monomer polymerizable with a vinyl benzyl chloride monomer. Examples of polymers include poly(styrene-co-vinyl benzyl chloride) and poly(methyl methacrylate-co-vinyl benzyl chloride).

According to one embodiment, the polymer represents between about 0.1 wt % and about 10 wt %, or between about 0.3 wt % and about 5 wt %, or between about 0.5 wt % and about 3 wt %, or between about 0.5 wt % and about 2 wt %, of the total weight of the particles. In another embodiment, the polymer represents between about 0.1 wt % and about 10 wt %, or between about 2 wt % and about 7 wt %, or between about 3 wt % and about 5 wt % of the total weight of the particles.

According to a further aspect, the present technology relates to a method for producing the electrode material as herein defined, the method comprising:

providing an electrochemically active material in the form of microparticles or nanoparticles having a surface comprising hydroxyl groups;

modifying the surface of the particle by grafting an organic linker to the hydroxyl groups;

providing at least one polymerizable monomer; and polymerizing the polymerizable monomer directly on the modified surface by reaction with the organic linker.

According to one example, the linker is an organic silicon based compound. In one embodiment, the monomer is polymerizable by radical or ionic polymerization. In another embodiment, the monomer is selected from styrenes, alkyl acrylates, alkyl methacrylates, alkyl vinyl ethers, acrylic acid, methacrylic acid, glycols, and combinations thereof.

In one embodiment, the polymer represents between about 0.1 wt % and about 10 wt %, or between about 0.3 wt % and about 5 wt %, or between about 0.5 wt % and about 3 wt %, or between about 0.5 wt % and about 2 wt %, of the total weight of the particles. In another embodiment, the polymer represents between about 0.1 wt % and about 10 wt %, or between about 2 wt % and about 7 wt %, or between about 3 wt % and about 5 wt % of the total weight of the particles.

In another embodiment, the polymerization step of the method further comprises the addition of an initiator, e.g. selected from azo-containing compounds (e.g. AIBN) and persulfate compounds (e.g. potassium persulfate).

According to a further aspect, the present technology relates to an electrode material comprising particles, said particles comprising a core-shell structure wherein:

the core comprises an electrochemically active material particles having a surface comprising hydroxyl groups; and the shell comprises a hydrophobic polymer and covers at least partially the surface;

wherein the hydrophobic polymer is grafted on the surface of the particle by one or more covalent bond(s).

In one embodiment, the hydrophobic polymer is grafted directly on the surface. In another embodiment, the hydrophobic polymer is grafted on the surface through a linker, e.g. a linker based on an organic silicon monomer comprising an ethylene substituent.

According to another embodiment, the hydrophobic polymer is based on monomers polymerizable via radical polymerization, for instance, based on at least one hydrophobic monomer comprising a halogen group, e.g. vinyl benzyl chloride. In one embodiment, the hydrophobic polymer is further based on at least one styrene monomer.

In one embodiment, an additional substituent is partially grafted on the hydrophobic polymer by covalent bonding, said substituent being adapted for improving adhesion of said hydrophobic polymer on said surface of the electrochemically active material. For instance, the additional substituent is 1,8-diazabicyclo[5.4.0]undec-7-ene.

In another embodiment, the hydrophobic polymer is based on at least one monomer selected from styrenes, alkyl acrylates, alkyl methacrylates, and alkyl vinyl ethers.

In a further embodiment, the hydrophobic polymer represents between about 0.1 wt % and about 10 wt %, or between about 0.3 wt % and about 5 wt %, or between about 0.5 wt % and about 3 wt %, or between about 0.5 wt % and about 2 wt %, of the total weight of the particles.

For instance, wherein the electrochemically active material is selected from:

LiM'PO$_4$ wherein M' is Fe, Ni, Mn, Co, or a combination thereof, each of which may be further partially replaced by a doping material, e.g. Zr and the like;

Li(M'$_{1-c}$A$_c$)$_{1-d}$X$_{1-d}$PO$_4$, M' is as defined above, A is Fe, Ni, Mn, or Co and is different from M', and X is a doping material, e.g. Zr, and the like, and c and d are greater than or equal to 0 and lower that 0.25;

LiMn$_2$O$_4$, wherein Mn may be partially replaced, for example, LiMn$_{2-a}$M$_a$O$_4$, wherein M, in this instance, may be selected from Co and Ni, and a is greater than or equal to 0 and lower that 0.5;

LiM"O$_2$, wherein M" is Mn, Co, Ni, or a combination thereof, e.g. LiCo$_{1-b}$M$_b$O$_2$, wherein M, in this instance, may be selected from Mn and Ni, and b is greater than or equal to 0 and lower that 0.25;

Li(NiM''')O$_2$, wherein M''' is Mn, Co, Al, Fe, Cr, Ti, or Zr, and combinations thereof; and vanadium oxides, lithium vanadium oxides (e.g. LiV$_3$O$_8$, V$_2$O$_5$, and the like).

In another example, the electrochemically active material is selected from:

titanates and lithium titanates such as TiO$_2$ (rutile, bronze, anatase), Li$_2$TiO$_3$, Li$_4$Ti$_5$O$_{12}$, H$_2$Ti$_5$O$_{11}$, H$_2$Ti$_4$O$_9$, or a combination thereof, wherein Ti may be further optionally replaced in-part by a doping element; and Li$_4$Ti$_{5-e}$Z$_e$O$_{12}$, wherein Z is a doping element, for instance, selected from Zr, Ni, Ta, Cr, Co, La, Y, Ru, Mo, Mn, V, Nb, Sr, and the like, e.g. Zr, and e is greater than or equal to 0 and lower that 1.5;

carbon (e.g. graphite (C6), hard carbon, graphene and the like), the carbon can be spherical, midair, needle shaped, and the like, such as carbon black, acetylene black, furnace black, carbon fibers (e.g. VGCF), and the like; and Si, Si—C, SiO$_x$, Sn, SnO$_x$, Si—O—C, Ti—C.

According to yet another aspect, the present technology relates to a method for producing the electrode material as herein defined, the method comprising:

providing an electrochemically active material in the form of microparticles or nanoparticles having a surface comprising hydroxyl groups;

providing a hydrophobic polymer for grafting on the surface; and grafting said hydrophobic polymer on the surface of the particle, wherein the polymer is covalently grafted on the surface.

In one embodiment, the method further comprises grafting a substituent on the hydrophobic polymer before the grafting of said hydrophobic polymer on the surface, for improving adhesion of said hydrophobic polymer on said surface, e.g. the additional substituent is 1,8-diazabicyclo[5.4.0]undec-7-ene.

In another embodiment, the hydrophobic polymer is based on at least one hydrophobic monomer comprising at least one halogen substituent, e.g. vinyl benzyl chloride monomer.

In a further embodiment, the hydrophobic polymer is based on at least one hydrophobic monomer polymerizable with at least one hydrophobic monomer comprising at least one halogen substituent, e.g. based on at least one hydrophobic monomer polymerizable with a vinyl benzyl chloride monomer. For instance, the hydrophobic polymer is selected from the group consisting of poly(styrene-co-vinyl benzyl chloride) and poly(methyl methacrylate-co-vinyl benzyl chloride).

In yet another embodiment, the hydrophobic polymer represents between about 0.1 wt % and about 10 wt %, or between about 0.3 wt % and about 5 wt %, or between about 0.5 wt % and about 3 wt %, or between about 0.5 wt % and about 2 wt %, of the total weight of the particles.

According to a further aspect, the present technology relates to a method for producing the electrode material herein defined, the method comprising:

providing an electrochemically active material in the form of microparticles or nanoparticles having a surface comprising hydroxyl groups;

modifying the surface of the particle by grafting a polymerizable organic silicon based compound to the hydroxyl groups;

providing at least one polymerizable hydrophobic monomer; and polymerizing the hydrophobic monomer directly on the modified surface by reaction with the organic silicon based compound.

In one embodiment, the hydrophobic monomer is polymerizable by radical polymerization. For example, the hydrophobic monomer is selected from styrenes, alkyl acrylates, alkyl methacrylates, and alkyl vinyl ethers, or a combination thereof.

In another embodiment, the hydrophobic polymer represents between about 0.1 wt % and about 10 wt %, or between about 0.3 wt % and about 5 wt %, or between about 0.5 wt % and about 3 wt %, or between about 0.5 wt % and about 2 wt %, of the total weight of the particles.

In another embodiment, the polymerization step further comprises the addition of an initiator, for instance, selected from azo-containing compounds (e.g. AIBN) and persulfate compounds (e.g. potassium persulfate).

According to another aspect, the present application further relates to an electrode material comprising particles, said particles comprising a core-shell structure, wherein:

the core comprises an electrochemically active material particles having a surface comprising hydroxyl groups; and the shell comprises a hydrophilic polymer and covers at least partially the surface;

wherein the polymer is grafted on the surface of the particle by one or more covalent bond(s).

In one embodiment, the polymer is grafted directly on the surface. In another embodiment, the polymer is grafted on the surface through a linker, e.g. an organic silicon comprising an ethylene substituent.

In another embodiment, the polymer is based on monomers polymerizable via radical or ionic polymerization. For example, the polymer is based on at least one monomer comprising a halogen group. In another embodiment, an additional substituent is partially grafted on the polymer by covalent bonding, said additional substituent improving adhesion of said polymer on said surface of the electrochemically active material, e.g. the additional substituent is 1,8-diazabicyclo[5.4.0]undec-7-ene.

In one embodiment, the hydrophilic polymer is based on monomers selected from alkyl acrylates, alkyl methacrylates, alkyl vinyl ethers, acrylic acid, methacrylic acid, glycols, and combinations thereof.

In another embodiment, the polymer represents between about 0.1 wt % and about 10 wt %, or between about 2 wt % and about 7 wt %, or between about 3 wt % and about 5 wt % of the total weight of the particles.

In one example, the electrochemically active material is selected from:

LiM'PO$_4$ wherein M' is Fe, Ni, Mn, Co, or a combination thereof, each of which may be further partially replaced by a doping material, e.g. Zr and the like;

Li(M'$_{1-c}$A$_c$)$_{1-d}$X$_{1-d}$PO$_4$, M' is as defined above, A is Fe, Ni, Mn, or Co and is different from M', and X is a doping material, e.g. Zr, and the like, and c and d are greater than or equal to 0 and lower that 0.25;

LiMn$_2$O$_4$, wherein Mn may be partially replaced, for example, LiMn$_{2-a}$M$_a$O$_4$, wherein M, in this instance, may be selected from Co and Ni, and a is greater than or equal to 0 and lower that 0.5;

LiM"O$_2$, wherein M" is Mn, Co, Ni, or a combination thereof, e.g. LiCo$_{1-b}$M$_b$O$_2$, wherein M, in this instance, may be selected from Mn and Ni, and b is greater than or equal to 0 and lower that 0.25;

Li(NiM''')O$_2$, wherein M''' is Mn, Co, Al, Fe, Cr, Ti, or Zr, and combinations thereof; and vanadium oxides, lithium vanadium oxides (e.g. LiV$_3$O$_5$, V$_2$O$_5$, and the like).

In another example, the electrochemically active material is selected from:

titanates and lithium titanates such as TiO$_2$ (rutile, bronze, anatase), Li$_2$TiO$_3$, Li$_4$Ti$_5$O$_{12}$, H$_2$Ti$_5$O$_{11}$, H$_2$Ti$_4$O$_9$, or a combination thereof, wherein Ti may be further optionally replaced in-part by a doping element; and Li$_4$Ti$_{5-e}$Z$_e$O$_{12}$, wherein Z is a doping element, for instance, selected from Zr, Ni, Ta, Cr, Co, La, Y, Ru, Mo, Mn, V, Nb, Sr, and the like, e.g. Zr, and e is greater than or equal to 0 and lower that 1.5;

carbon (e.g. graphite (C6), hard carbon, graphene and the like), the carbon can be spherical, midair, needle shaped, and the like, such as carbon black, acetylene black, furnace black, carbon fibers (e.g. VGCF), and the like; and Si, Si—C, SiO$_x$, Sn, SnO$_x$, Si—O—C, Ti—C.

According to another aspect, the present technology relates to a method for producing the electrode material, the method comprising:

providing an electrochemically active material in the form of microparticles or nanoparticles having a surface comprising hydroxyl groups;

modifying the surface of the particle by grafting an organic linker to the hydroxyl groups;

providing at least one polymerizable hydrophilic monomer; and polymerizing the hydrophilic monomer directly on the modified surface by reaction with the organic linker.

In one embodiment, the linker is an organic silicon based compound. In another embodiment, the monomer is polymerizable by radical or ionic polymerization. In another embodiment, the monomer is selected from alkyl acrylates, alkyl methacrylates, alkyl vinyl ethers, acrylic acid, methacrylic acid, glycols, and combinations thereof.

In another embodiment, the hydrophilic polymer represents between about 0.1 wt % and about 10 wt %, or between about 2 wt % and about 7 wt %, or between about 3 wt % and about 5 wt % of the total weight of the particles.

In a further embodiment, the polymerization of the method step further comprises the addition of an initiator, for instance, an initiator selected from azo-containing compounds (e.g. AIBN) and persulfate compounds (e.g. potassium persulfate).

According to yet another aspect, the present technology further relates to an electrode comprising the electrode material as herein defined, on a current collector. For example, the electrode material may further comprise a conductive agent, a binder, and optionally other additives, for instance, conductive agents, binders, and optionally other additives each being as herein defined. Similarly, the present technology also relates an electrochemical cell comprising at least one anode, at least one cathode and at least one electrolyte, wherein at least one of the anode and cathode comprises the electrode material as herein defined. For example, the electrochemical cell comprises a cylindrical, pouch, prismatic, or spherical casing. A module or pack comprising the electrochemical cell is also contemplated. In another aspect, the present technology relates to the use of an electrochemical cell as herein defined, in an electrical or hybrid vehicle, as on-board battery, or in an IT or ubiquitous device.

DETAILED DESCRIPTION

Figure 1:
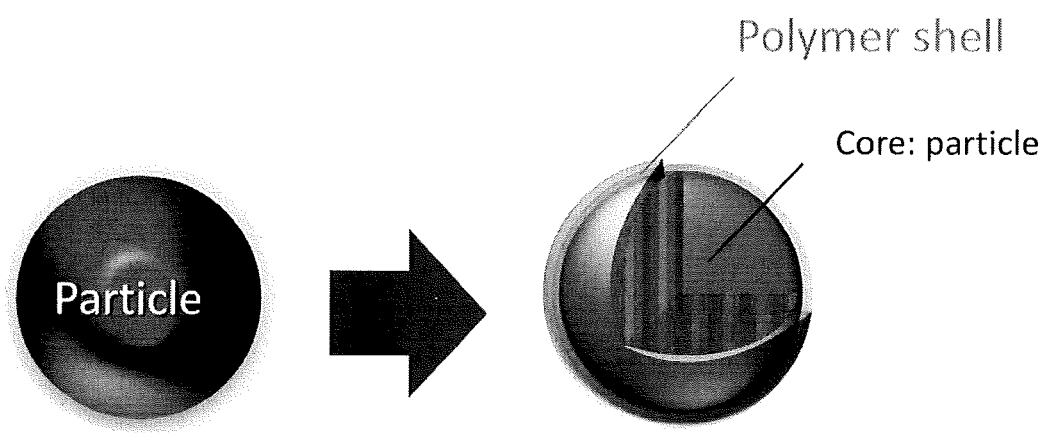
FIG. 1 shows the schematic representation of a particle with a core-shell structure in accordance with one embodiment.

Battery degradation often takes place during battery cycling when the formation of $CO_2$ and other gaseous by-products in induced by traces of water which may be present in the electrochemical cell as residual contamination from one or both electrodes. This application thus relates to electrode materials, for instance, useful in preventing the degradation of electrochemical cells. Such electrode material mainly consists in electrochemically active material particles covered with a polymer shell coating covalently attached to the particle. The polymer may be hydrophobic (e.g. poly(styrene-co-vinyl benzyl chloride)) but also hydrophilic (e.g. based on poly(acrylic acid) or poly(methacrylic acid)).

For instance, the polymer would be able to limit the degradation of the battery by increasing the retention capacity and stabilizing the resistance of the electrode with accelerated aging. Thus, the undesirable reaction occurring at the particle surface between the electrolyte and residual water, which involves the formation of gas, may be reduced or prevented. The polymer shell may significantly improve the adhesion of the electrode slurry with the current collector. The adhesion of the polymer with the active materials may be further improved by grafting DBU and forming a second shell in-situ during cell operation.

More particularly, this technology relates to an electrode material comprising particles having a core-shell (CS) structure and to methods for producing said electrode material. This shell serves as a protective layer and is directly and covalently grafted on the electrochemically active material particles, rather than on the entire electrode.

As such, the core-shell particles comprise a core particle of electrochemically active material having a particle surface and a polymer shell covering at least partially the surface. For instance, the electrochemically active material comprises hydroxyl groups on its surface. The electrochemically active material comprising hydroxyl groups on the surface includes, without limitation, any kind of lithium titanium oxide (hereafter referred to as LTO), carbon (e.g. graphite particles), $TiO_2$, Ti/C, Si, Si/C, $SiO_2$, or any other oxide compound comprising hydroxyl groups on the particle surface. The present technology may also be applicable to electrochemically active cathode material comprising hydroxyl groups on its surface. For instance, the electrochemically active material for use in a cathode can be a lithium insertion material, such as:

$LiM'PO_4$ wherein M' is Fe, Ni, Mn, Co, or a combination thereof, each of which may be further partially replaced by a doping material, e.g. Zr and the like;

$Li(M'_{1-c}A_c)_{1-d}X_{1-d}PO_4$, M' is as defined above, A is Fe, Ni, Mn, or Co and is different from M', and X is a doping material, e.g. Zr, and the like, and c and d are greater than or equal to 0 and lower that 0.25;

$LiMn_2O_4$, wherein Mn may be partially replaced, for example, $LiMn_{2-a}M_aO_4$, wherein M, in this instance, may be selected from Co and Ni, and a is greater than or equal to 0 and lower that 0.5;

$LiM"O_2$, wherein M" is Mn, Co, Ni, or a combination thereof, e.g. $LiCo_{1-b}M_bO_2$, wherein M, in this instance, may be selected from Mn and Ni, and b is greater than or equal to 0 and lower that 0.25;

$Li(NiM''')O_2$, wherein M''' is Mn, Co, Al, Fe, Cr, Ti, or Zr, and combinations thereof; and vanadium oxides, lithium vanadium oxides (e.g. $LiV_3O_8$, $V_2O_5$, and the like).

Examples of electrochemically active material for anodes include:

titanates and lithium titanates such as $TiO_2$ (rutile, bronze, anatase), $Li_2TiO_3$, $Li_4Ti_5O_{12}$, $H_2Ti_5O_{11}$, $H_2Ti_4O_9$, or a combination thereof, wherein Ti may be further optionally replaced in-part by a doping element; and $Li_4Ti_{5-e}Z_eO_{12}$, wherein Z is a doping element, for instance, selected from Zr, Ni, Ta, Cr, Co, La, Y, Ru, Mo, Mn, V, Nb, Sr, and the like, e.g. Zr, and e is greater than or equal to 0 and lower that 1.5;

carbon (e.g. graphite (C6), hard carbon, graphene and the like), the carbon can be spherical, midair, needle shaped, and the like, such as carbon black, acetylene black, furnace black, carbon fibers (e.g. VGCF), and the like; and Si, Si—C, $SiO_x$, Sn, $SnO_x$, Si—O—C, Ti—C.

Without wishing to be bound by theory, in is believed that the hydroxyl groups on the surface of particles would be responsible for the production of $CO_2$ and the degradation of the electrode. In the proposed CS particles, the oxidation of the hydroxyl group would be prevented by providing a protective layer of polymer on the surface. The use of such electrode material in the preparation of electrodes may thereby improve the durability of the electrochemical cell. The covalently-bound polymer forming the shell may be of hydrophobic or hydrophilic nature and may be a homopolymer, co-polymer, block-copolymer, etc.

The core-shell particles may be made through different processes. One method involves grafting of the pre-formed polymer directly on the particle (graft-on method). For the covalent grafting to take place, the polymer must be containing leaving groups, such as halogens, which can be displaced by a hydroxyl group on the core particle. Another method comprises the in-situ formation of a grafted polymer (graft-from method), which involves a linking moiety attached to the particle and acting as the initiating point for the polymerization of monomers. The linking which may be the same or different from one of the monomers.

For instance, the CS particles may comprise a protective layer made of at least one polymer, such as a hydrophobic polymer, the hydrophobic polymer being covalently grafted on the particle surface through a graft-on method. The hydrophobic polymer comprises at least one hydrophobic monomer with at least one leaving group, e.g. halogen substituent, such as vinyl benzyl chloride. More specifically, the hydrophobic polymer may be poly(styrene-co-vinyl benzyl chloride), poly(methyl methacrylate-co-vinyl benzyl chloride), or any other hydrophobic polymer comprising halogen substituents. For instance, the molecular weight of the poly(styrene-co-vinyl benzyl chloride) is within the range $M_n$=3500-9000 g/mol, or 3000-7000 g/mol, or 5000-7000 g/mol, or 5500-6500 g/mol. For example, the molar concentration of vinyl benzyl chloride monomer in the polymer is between about 40% and about 60%.

The polymer may be a co-polymer of a first monomer with at least one halogen substituent, and a second monomer able to react with the first monomer by radical, ionic or cationic polymerization.

The polymer may be further partially substituted with a substituent for improved adhesion of said polymer on the particle surface. The additional substituent is covalently grafted on the polymer. For example, the additional substituent may be 1,8-diazabicyclo[5.4.0]undec-7-ene (DBU). This additional substituent forms a second shell on the particle.

The polymer may also be grown directly on the particle surface via a graft-from method. In this case, the polymer may be formed of any monomer that can be polymerized by radical polymerization. The surface of the particle may be first modified by a linker, such as a silicon based compound comprising an organic substituent able to polymerize with the monomer. In one example, the hydrophobic monomer is selected from styrene, alkyl acrylates, alkyl methacrylates, and alkyl vinyl ethers, or combinations thereof, or hydrophilic monomers such as acrylates, methacrylates, and glycols or combinations thereof. The polymer formed on the surface of the particle may be, without limitation, poly (styrene-co-vinyl benzyl chloride), poly(methyl methacrylate-co-vinyl benzyl chloride), (poly(n-butyl vinyl ether), poly(n-butyl acrylate), poly(acrylic acid), poly(methacrylic acid), poly(ethylene glycol) ether methyl methacrylate, or a co-polymer thereof, or any other compatible polymer that can be formed by radical polymerization.

The quantity of polymer forming the shell that covers the particle is an important feature with regard to the efficiency of the electrode. The CS particles may, for example, comprise between about 0.1 wt % and about 10 wt %, or between about 0.3 wt % and about 5 wt %, or between about 0.5 wt % and about 3 wt %, or between about 0.5 wt % and about 2 wt % of polymer as a shell, based on the total weight of the CS particles, for instance, when the polymer is a hydrophobic polymer. Alternatively, the CS particle may, for example, comprise between about 0.1 wt % and about 10 wt %, or between about 2 wt % and about 7 wt %, or between about 3 wt % and about 5 wt % of polymer as a shell, based on the total weight of the CS particles, for instance, when the polymer is a hydrophilic polymer.

In the first method, the surface of the particle is not modified, and the pre-formed polymer is directly grafted on the surface, using a graft-on technique. In this method, the polymer is pre-formed before being grafted on the surface of the particle. The grafting of such a polymer relies on the presence of the hydroxyl groups on the particle surface, the hydroxyl groups being able displace leaving groups on the polymer chain, e.g. halogen substituents, in the presence of a catalyst such as a basic catalyst. The basic catalyst may be lithium hydroxide (LiOH) for example. The polymer is therefore covalently grafted on the surface.

In this method, the polymer is formed by polymerization of at least one hydrophobic monomer bearing at least one leaving group, such as a halogen substituent (e.g. Cl). The polymer may also be formed by polymerization of at least one such monomer and at least another monomer able to polymerize with the at least one monomer bearing the leaving group. In one example, the polymer is formed of a monomer of vinyl benzyl chloride and at least another monomer able to polymerize therewith, e.g. styrene. Examples of polymers to be grafted include, without limitation, poly(styrene-co-vinyl benzyl chloride), poly(methyl methacrylate-co-vinyl benzyl chloride), or any other hydrophobic polymer comprising halogen substituents.

The method may further comprise, before grafting of the polymer on the core particle surface, partially incorporating a substituent on the polymer, for instance, to improve the adhesion of the polymer with the particle surface. For example, the additional substituent may be DBU. The grafting is based on a nucleophilic substitution, the additional substituent displacing the leaving group (e.g. halogen substituent) on the polymer. The substitution reaction may include the use of a strong base, which may further be n-butyl lithium. The additional substituent is therefore covalently bonded to the polymer. The additional substituent is only partially incorporated, i.e. some of the leaving groups on the polymer are left unreacted, in order for the polymer to be further grafted on the core particle surface.

Figure 9:
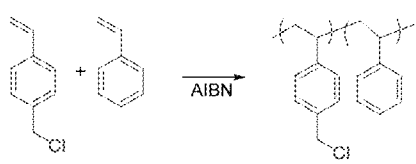
FIG. 9 shows one example of a graft-on method in Scheme 1.
Figure 9:
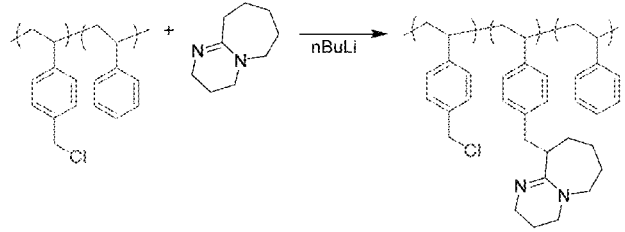
Figure 9:
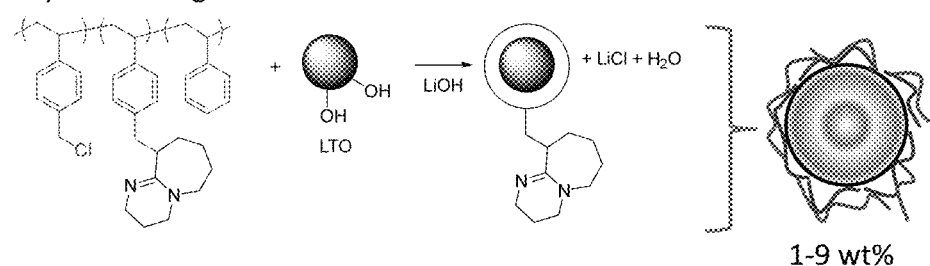

One example of a graft-on method is shown in Scheme 1 as shown in FIG. 9. In this scheme, an additional substituent (DBU) is incorporated to the polymer before the polymer is grafted on the particle surface. In step 1, vinyl benzyl chloride reacts with styrene in a radical polymerization to form poly(stryrene-co-vinyl benzyl chloride). Then in step 2, DBU is partially incorporated on the polymer by nucleophilic substitution under basic conditions of part of the chloride substituent on the poly(stryrene-co-vinyl benzyl chloride). The base used is, for instance, n-butyl lithium. Finally, in step 3, the polymer, partially grafted with DBU and still comprising chloride substituents, is grafted on the particle surface in the presence of a base such as lithium hydroxide.

In a second method, the particle surface is first modified with a linker. The modification of the particle surface is therefore the first step and may involve the grafting of a linker, such as an organic silicon based compound, on said surface. The linker, e.g. organic silicon based compound, reacts with the hydroxyl groups present on the particle surface. Once the organic silicon based compound is grafted, the shell of the CS particle may be formed by radical polymerization of a monomer being polymerizable with the organic substituent of the organic silicon based compound. As the polymer is grown directly on the surface of the particle, such a method is called "graft from" method. One advantage of this method is the fact that the polymerization can be performed in aqueous media with hydrophobic monomers, thereby increasing the probabilities of contacting the silane groups with the monomers, this within the green process. For example, the polymerization step is carried out by emulsion polymerization (e.g. with hydrophobic monomers and an aqueous solvent) or inverse-emulsion polymerization (e.g. with hydrophilic monomers and an organic solvent). The polymerization step may further include heating or irradiating the mixture containing the modified particles and monomers, for instance, in the presence of an initiator.

Examples of polymers formed on the modified surface include, without limitation, poly(methyl methacrylate-co-vinyl benzyl chloride), (poly(n-butyl vinyl ether), poly(n-butyl acrylate), polystyrene, poly(acrylic acid), poly(methacrylic acid), poly(ethylene glycol) ether methyl methacrylate, or a co-polymer thereof, or any other compatible polymer that can be formed by radical polymerization.

In one example, the final shell of represents about 1 wt % to about 5 wt %, or between 2 wt % to about 4 wt %, or about 3 wt % of the total weight of the CS particle, wherein the silicon based compound grafted on the surface represents from about 0.5 wt % to about 2.5 wt %, or about 1.2 wt % to about 2.0 wt %, or around 1.6 wt % and the polymer represents between 0.5 wt % to about 2.5 wt %, or about 0.8 wt % to about 2.0%, or around 1.4 wt % of the total weight of the CS particle.

Figure 10:
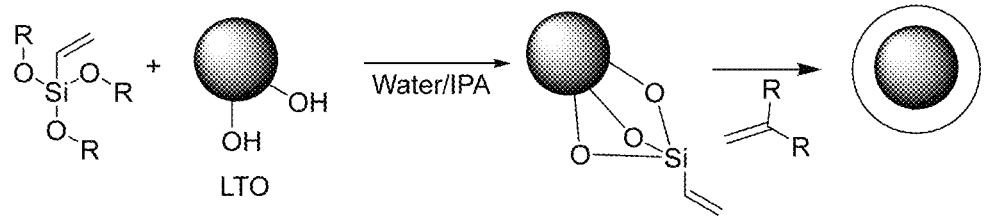
FIG. 10 shows one example of a method in Scheme 2.

An example of this method is shown in Scheme 2 as shown in FIG. 10, where an organic silicon based compound comprising an ethylene substituent is first grafted on the particle surface by reaction with the hydroxyl groups, for instance, in the presence of water and isopropanol. Then, in a second step, a polymer based is grown directly on the modified surface of the particle by radical polymerization (e.g. emulsion polymerization or inverse-emulsion polymerization) in the presence of an initiator (e.g. an azo, such as AIBN, or a persulfate, such as potassium persulfate), the organic substituent of the organic silicon based compound covalently linked on the particle surface serving as the polymerization starting unit. The polymerization step may further include heating or irradiating the mixture containing the particles, monomers and initiator.

Both methods described above may further comprise the mixing of the electrode material with a binder to be spread on the electrode current collector. As mentioned above, the hydrophobic polymer, or the hydrophobic monomer, may be selected as a function of the binder and the nature of the electrode collector, in order to improve the adhesion of said binder and core-shell particles, and, in turn, of the material on the electrode current collector.

In one embodiment, the electrode material improves the efficiency and the durability of the electrode, by increasing the retention capacity and the resistance of the electrode to accelerated aging, as shown in FIGS. 2 to 6. Thus, the electrode material may prevent the undesirable reaction at the active material particle surface which induces the formation of gas. Also, the polymer shell may significantly improve the adhesion of electrode material slurry on the current collector, when combined with a complementary binder.

The electrode material is for use in the preparation of electrodes. For example, the electrode material may be mixed as a slurry with a binder powder, a solvent and, optionally, additives for spreading on a substrate, e.g. a current collector.

The polymer used for the shell may be selected as a function of the binder and the nature of the current collector for better performance or to improve the adhesion of the particles and binder on the current collector. For example, poly(styrene)-based polymers may improve the adhesion for SBR/CMC binders. Likewise, poly(methyl methacrylate-co-vinyl benzyl chloride) or other polar polymers such as (poly(n-butyl vinyl ether) or other polyethers, may improve the adhesion of PVDF binder on aluminum current collectors, which is in turn spread on an aluminium current collector. Also, the grafting of a poly(acrylic acid) is compatible with poly(acrylic acid) used as a binder.

The binder can be, for example, PVDF, PTFE, SBR, CMC, PAA, and the like. Examples of binders further include water soluble binders such as SBR (styrene butadiene rubber), NBR (butadiene acrylonitrile rubber), HNBR (hydrogenated NBR), CHR (epichlorohydrin rubber), ACM (acrylate rubber), and the like, and cellulose-based binders (e.g. carboxyalkylcellulose, hydroxyalkylcellulose, and combinations), or any combination of two or more of these. For instance, the carboxyalkylcellulose may be carboxymethylcellulose (CMC) or carboxyethylcellulose. Hydroxypropylcellulose is an example of hydroxyalkylcellulose. Acidic binders such as poly(acrylic acid) and poly(methacrylic acid) are also contemplated. Other examples of binders include fluorine-containing polymeric binders such as PVDF and PTFE, and ion-conductive polymer binders such as block copolymers composed of at least one lithium-ion solvating segment and at least one cross-linkable segment.

The electrode material optionally includes additional components like conductive materials, inorganic particles, glass or ceramic particles, salts (e.g. lithium salts), and the like. Examples of conductive materials include carbon black, Ketjen™ black, acetylene black, graphite, graphene, carbon fibers, nanofibers (e.g. VGCF) or nanotubes, or a combination thereof.

For instance, the electrode composition spread on a current collector may have a composition by weight of core-shell particles of from 75% to 99%, a composition of carbon materials of 0.01% to 20%, or 1 to 10%, or 1.5 to 5.0%, and a composition of binder materials can be 1% to 10%, or 1.5 to 8.0%, or 2.0 to 5.0%.

The electrode herein produced is for use in electrochemical cells, the cells comprising at least one anode, at least one cathode and at least one electrolyte, where at least one of the anode and cathode comprises the electrode material as herein defined. For example, the casing of the battery can be cylindrical, pouch, prismatic, spherical, or in any other shape known and used in the field. Also included are modules or packs comprising the electrochemical cell as herein defined. The present application also contemplates the use of these electrochemical cells in electrical or hybrid vehicles, as on-board battery, and in IT and ubiquitous devices.

EXAMPLES

Example 1 a) Synthesis of Core-Shell Particles
Method 1
Step 1: Polymerization of Styrene and Vinyl Benzyl Chloride In a round bottom flask, 5.7 g of styrene, 7.2 g of vinyl benzyl chloride and 100 mL of toluene, were added and bubbled with nitrogen for 30 min, in the order to remove oxygen. Then, 302 mg of AIBN (azobisisobutyronitrile) were added and the flask was heated at 95° C. for a minimum of 12 hours. The formed polymer was purified by precipitation in methanol and dried under vacuum for 12 hours. The polymer had a molecular weight of $M_n$=5500-6500 g/mol, and a polydispersity index of PDI=2.5.

Step 2: Grafting of DBU on Polymer (Facultative Step)

In a flask, 1.8 mL of DBU were added to 100 mL of dry THF. The flask was then cooled at 4° C. under inert atmosphere. A solution of 2.5 mL of nBuLi in hexanes (2.5M) was added dropwise to the mixture under a stream of nitrogen. The flask was kept at 4° C. for 1 hour under stirring and nitrogen. After 1 hour, a solution of 6.6 g of the formed polymer dissolved in 100 mL of dry THF was added slowly to the flask under flux of nitrogen at 4° C. The solution was kept under stirring and nitrogen atmosphere at room temperature for 12 hours.

Step 3: Grafting on Particles

The solution produced in step 2 was used without any purification. 200 mL of THF or DMF, 20.0 g of particles (anode material LTO T30-D8, from Posco), 6.8 g of $LiOH.H_2O$ and the solution of step 2 were added in a round bottom flask of 1000 mL. The slurry was heated under reflux and stirred vigorously for 48 hours. After this period, the slurry was cooled at room temperature and filtered. The solid was transferred in an Erlenmeyer of 400 mL with 200 mL of water and 100 mL of methanol. The slurry is stir vigorously for 24 hours, then filtered, and the residual solid was washed 3 times with water and 3 times with acetone. The solid was transferred in a 200 mL Erlenmeyer with 100 mL of dichloromethane. The slurry was stirred vigorously for 2 hours, then filtered, and the residual solid was washed 3 times with dichloromethane and finally dried under vacuum at 60° C. for 12 hours.

Method 2
Step 1: Grafting Vinyltrimethoxysilane (VMS) on Particles

In a round bottom flask of 250 mL, 20.0 g of particles (anode material LTO T30-D8, from Posco), 80 mL of 2-propanol, 20 mL of demineralized water and 2.0-4.0 g of VMS were added. The slurry was stirred and heated at 60° C. for 4-12 hours. The slurry was then cooled at room temperature and filtered. The residual solid was washed with 3 portions of 2-propanol. The solid was then dried at 60° C. under vacuum for 4 hours.

Step 2(a): Emulsion Polymerization of Hydrophobic Monomers on Particles

In a 200 mL beaker, 20.0 g of grafted particles from the step 1 and 100 mL of demineralized water were added. The beaker was immersed in an ice bath. The slurry was stirred and sonicated at 70% during 6 minutes. A solution of 2.0 g of purified methyl methacrylate and 11 mg of AIBN were added to the slurry. The slurry was stirred and sonicated at 70% for another 6 minutes. The slurry was transferred in a 250 mL round bottom flak and bubbled with nitrogen for 30 min. The flask was topped with a condenser and kept under nitrogen. The flask was then heated at 70° C. for 12 hours. The slurry was cooled to room temperature and filtered. The residual solid was washed 3 times with acetone and then transferred in a 200-mL Erlenmeyer with 100 mL of dichloromethane. The slurry was stirred vigorously for 2 hours, filtered and the residual solid was washed 3 times with dichloromethane and finally dried under vacuum at 60° C. for 12 hours.

Step 2(b): Inverse-Emulsion Polymerization of Hydrophilic Monomers on Particles

In a 200-mL beaker, 20.0 g of particles from the step 1 and 100 mL of cyclohexane were added. The beaker was immersed in an ice bath and the slurry was stirred and sonicated at 70% during 6 minutes. 2.0 g of acrylic acid or of acrylic acid and poly(ethylene glycol) ether methyl methacrylate (1:1) previously purified by standard techniques, and a solution of 11 mg of KPS (potassium persulfate) in 2.0 g of demineralized water were added to the slurry. The slurry was then stirred and sonicated at 70% for another 6 minutes. The content of the beaker was transferred into a 250-mL round bottom flak and bubbled with nitrogen for 30 min. The flask was topped with condenser, kept under nitrogen, and heated at 70° C. for 12 hours. The slurry was cooled to room temperature and filtered. The recovered solid was washed 5 times with acetone and transferred in a 200-mL Erlenmeyer with 100 mL of dichloromethane. The slurry obtained was stirred vigorously for 2 hours. The slurry was then filtered and the solid was washed 3 times with dichloromethane and dried under vacuum at 60° C. for 12 hours.

b) Characterization

CS particles were prepared using both methods described above and analyzed.

Thermo-Gravimetric Analyse (TGA)

Figure 2:
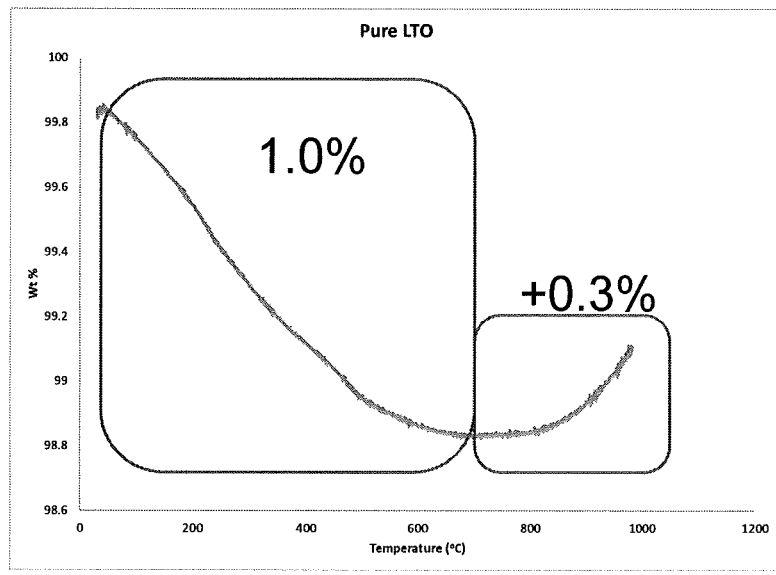
FIG. 2 shows two spectra of a thermogravimetric analyses (TGA) of the particle (a) before formation of the shell, and (b) after formation of the shell.
Figure 2:
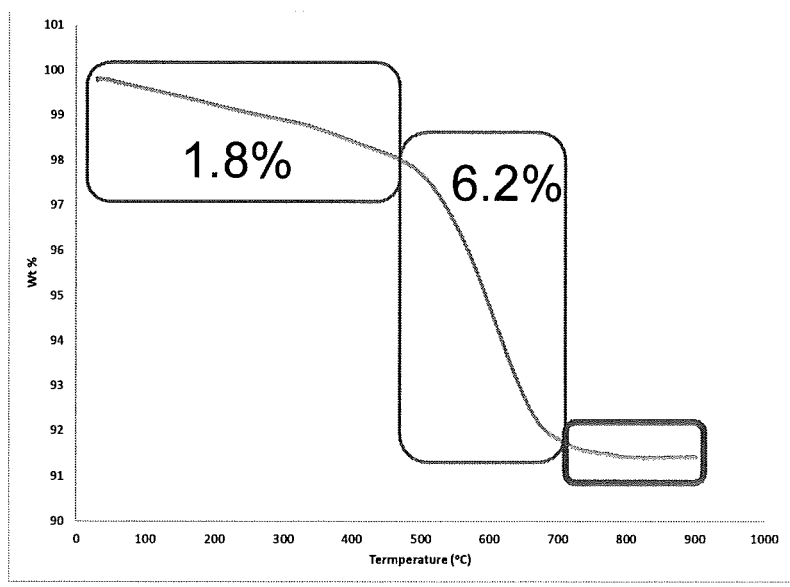

The amount of polymer on the particle is evaluated by TGA. The results of FIG. 2 show TGA spectra (a) before and (b) after the formation of the shell. The CS particle is produced using the "graft from" method described herein. The loss between 250° C. and 600° C. is characteristic of the polymer and allow confirming the actual grafting of the polymer on the surface.

In spectrum (a) an inflection is observable at between 600° C. and 800° C., this inflection indicates an oxidation of the hydroxyl groups on the surface of the particle, therefore, resulting in a degradation of the anode by water. In spectrum (b), no inflection is observable, meaning that the oxidation does not occur and that particles are correctly protected by their polymer shell.

Transform Fourier Infra-Red Analyse (FTIR)

Figure 3:
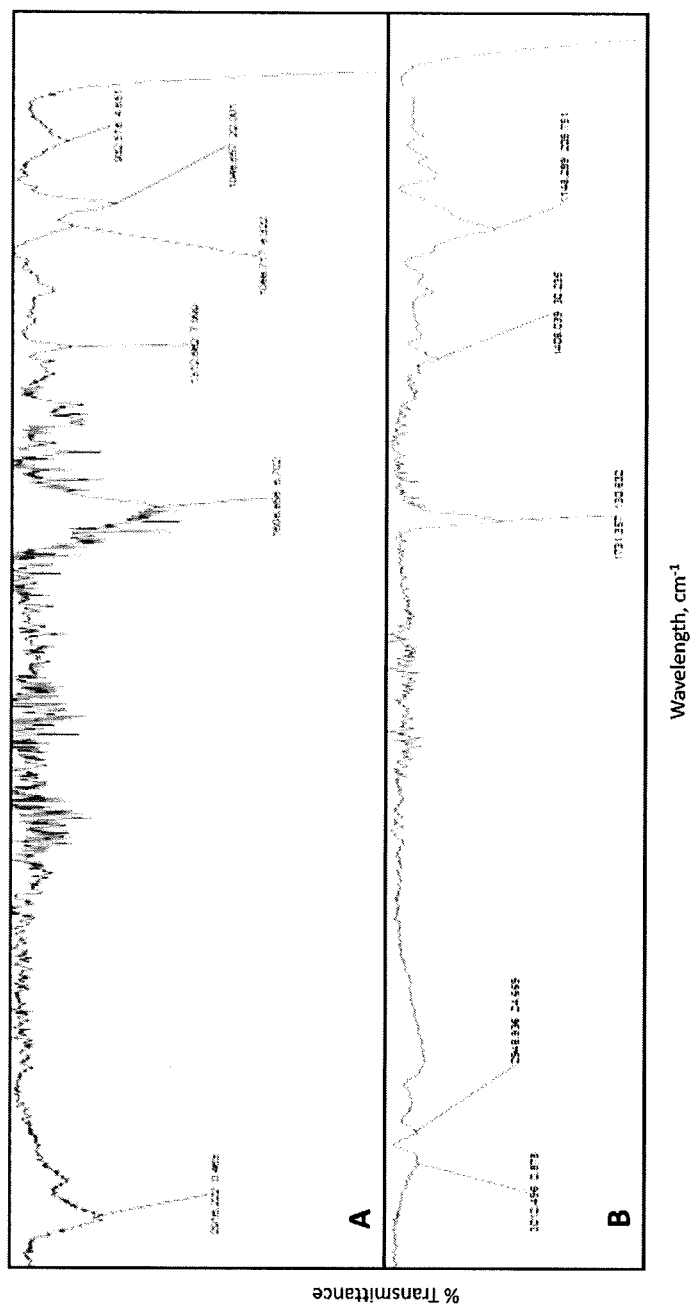
FIG. 3 shows two Fourier Transform Infra-Red (FTIR) spectra of core-shell structure particles produced using: (a) a first method according to one embodiment, and (b) a second method according to another embodiment.

The polymer shell was characterized by FTIR. FIG. 3 shows the spectra for core-shell particles synthetized using (a) the "graft on" method described herein and (b) the "graft from" method also described herein. As can be seen in FIG. 3, the signal in spectrum (b) is higher than in spectrum (a). It can be correlated to the fact that the shell polymer is most likely denser on the surface of the particle when using the "graft from" method.

Transmission Electron Microscopy (TEM)

Figure 4:
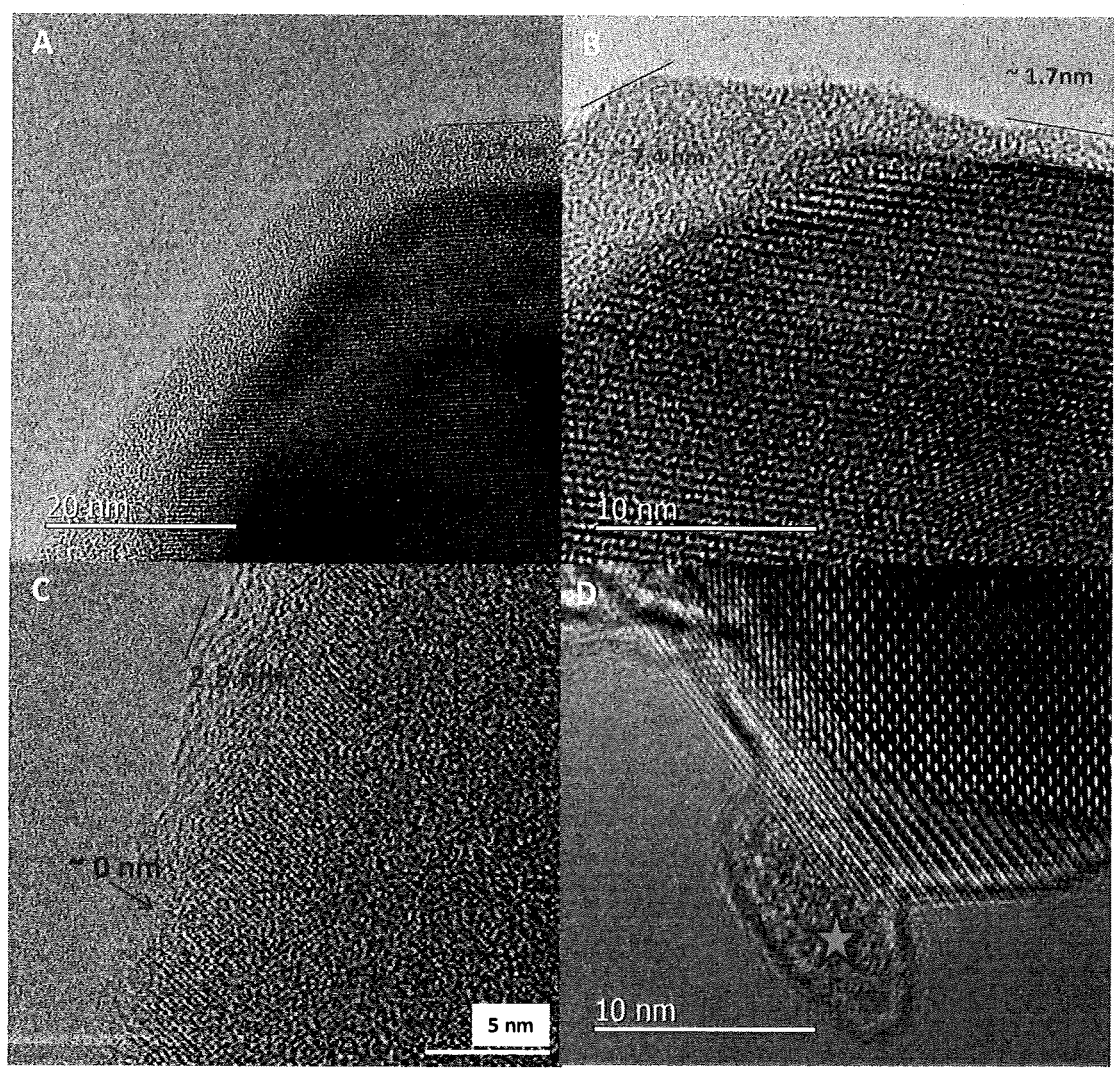
FIG. 4 shows TEM images of core-shell LTO particles covered with poly/sturene-co-vinyl benzyl chloride).

The polymer shell produced using the "graft on" method was also further observed by TEM. FIG. 4 shows the image of an LTO particle covered with the poly(styrene-co-vinyl benzyl chloride). As can be seen, the shell is not homogeneous and the thickness varies between 2-7 nm.

Example 2

To assess the improvement involved by the proposed technology, eight different 2032 type coin cells were assembled with an LTO electrode, a polyethylene (PE) separator, an organic electrolyte and a lithium metal foil. The LTO electrode was composed of active materials, conductive carbon as a collector and PVDF or SBR/CMC as a binder. The organic electrolyte was composed of lithium salt and linear carbonate with cyclic carbonates. Two of the eight coin cells were made of standard particles, one of carbon coated particles, and five of CS particles described in the present application. The CS particles comprise different content (% wt v. total weight of the particles) of polymer shell, the presence or absence of DBU as an additional substituent, and are produced by the "graft on" or the "graft from" methods.

Figure 5:
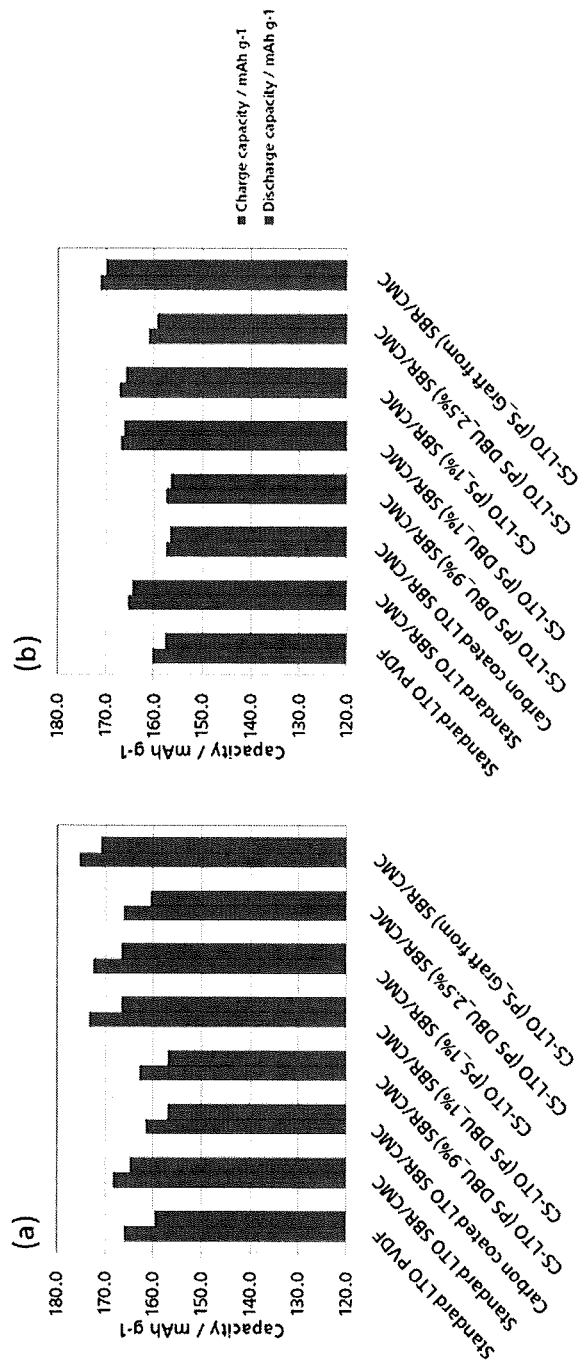
FIG. 5 shows the charge (left bar) and discharge (right bar) capacities of various electrodes (a) after 1 cycle of the cycling of the battery, (b) after 2 cycles.

Charge discharge tests were performed to measure the capacities at room temperature (25° C.) by applying 0.6 mA of current. The results are shown in FIG. 5 and Table 1 below. The electrode material, when mixed with a binder and used on an electrode, does not alter, and may further improve the charge and discharge capacities of the electrode. FIG. 5 shows that after 1 cycle of battery cycling (a), five (5) of the CS particles proposed in the present application present charge and discharge capacities similar or superior to standard particles or carbon coated particles. More specifically, the CS particles comprising 1 wt % of polymer (polystyrene with and without DBU substituent), and the CS particle produce by the "graft from" method showed better results. The same conclusions can be made after 2 cycles (b). Overall, charge discharge efficiency demonstrates the electrochemical stability of the polymer shells.

Example 3

Charge/discharge tests were performed by applying high current ("Load test") using coin cells as described in Example 2. The current applied was 4 ItA. 1 ItA is the current that can charge or discharge all the capacity of the cell in 1 hour. For example, 4 ItA of the cell with 2 mAh will be 8 mA.

Figure 6:
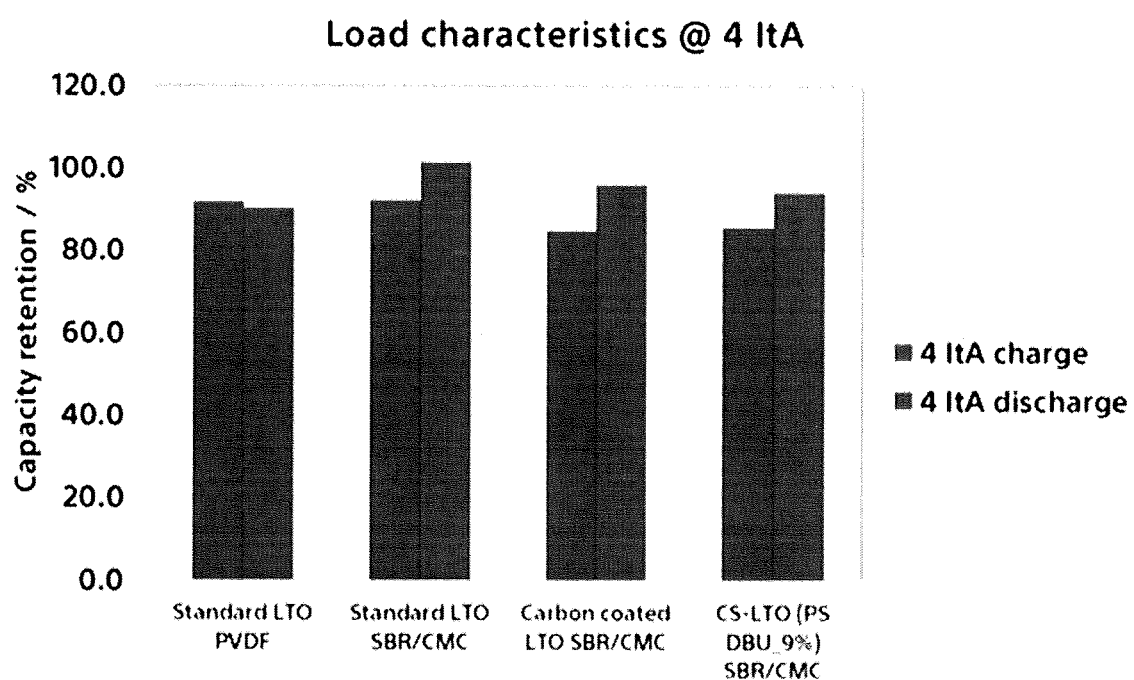
FIG. 6 shows the capacity retention for various electrodes during charge (left bar) and discharge (right bar) tests at 4 ItA.

The capacity retention of each of the coin cells tested was measured. FIG. 6 presents four of the eight results. Additional results are also listed in Table 1. The electrode material, when mixed with a binder and used on an electrode, does not alter the capacity retention of said electrode during charge and discharge tests in comparison with standard particles or carbon coated particles. As such, the polymer shell was showed not to impede the fast migration of lithium ions.

Example 4

A float test was performed at 45° C. applying 1.0 V vs. Li/Li$^+$ for 72 hours using the coin cells described in example 2. The test capacity was measured at 0.2 ItA, and the capacity retention was calculated by the equation: "Capacity retention=(the capacity after the float test measured at 0.2 ItA)/(the capacity before the float test measured at 0.2 ItA)".

Figure 7:
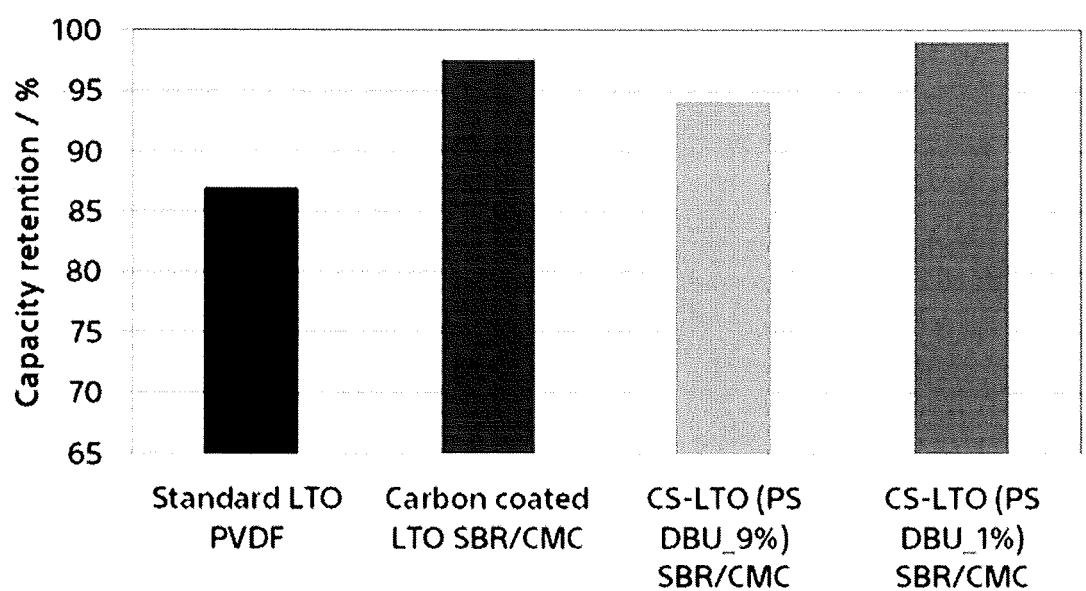
FIG. 7 shows the capacity retention for various electrodes during charge and discharge test at 0.2 ItA after a float test.

The results for four of the eight coin cells tested are presented in FIG. 7. Additional results are also presented in Table 1. The electrode material may improve the capacity retention of the electrode after float tests. FIG. 7 shows that the CS particles in accordance with the proposed technology present better capacity retention than standard LTO particles in PVdF after float test. The CS particles also showed better capacity retention after float test than carbon coated particles when the polymer shell represents 1% of the CS particles.

TABLE 1

|  | Efficiency at $1^{st}$ cycle | Load 4ItA Charge (CC Charge) | Load 4ItA Discharge | Capacity retention 45° C. float |
|---|---|---|---|---|
| Standard LTO - PVdF | 96 | 92 | 90 | 87 |
| Standard LTO - SBR/CMC | 98 | 92 | 100 | 95 |
| Carbon-coated LTO - SBR/CMC | 97 | 85 | 96 | 98 |
| CS LTO PS-DBU 9% - SBR/CMC | 96 | 85 | 94 | 94 |
| CS LTO PS-DBU 1% - SBR/CMC | 96 | 86 | 97 | 99 |
| CS LTO PS 1% - SBR/CMC | 97 | 84 | 95 | 100 |
| CS LTO PS-DBU 2.5% - SBR/CMC | 97 | 89 | 97 | 100 |
| CS LTO PS-graft from 3% - SBR/CMC | 97 | 83 | 95 | 98 |
| CS LTO PMMA-graft from - PVdF | 95 | 80 | 9 | 76 |

Example 5

A cell using the material obtained from step 2(b) of Example 1 (where the polymer produced is PEGMA-PAA 1:1, at a concentration of 7 wt % of the total weight of the particles) was prepared as in Example 2, except the lithium foil was replaced with a LiFePO$_4$ electrode (LFP CS-LTO 7% PEGMA-PAA). The cell was compared to a LFP-LTO standard cell without the polymer coating. Impedance of the cell was measured at low temperature (−30° C.).

Figure 8:
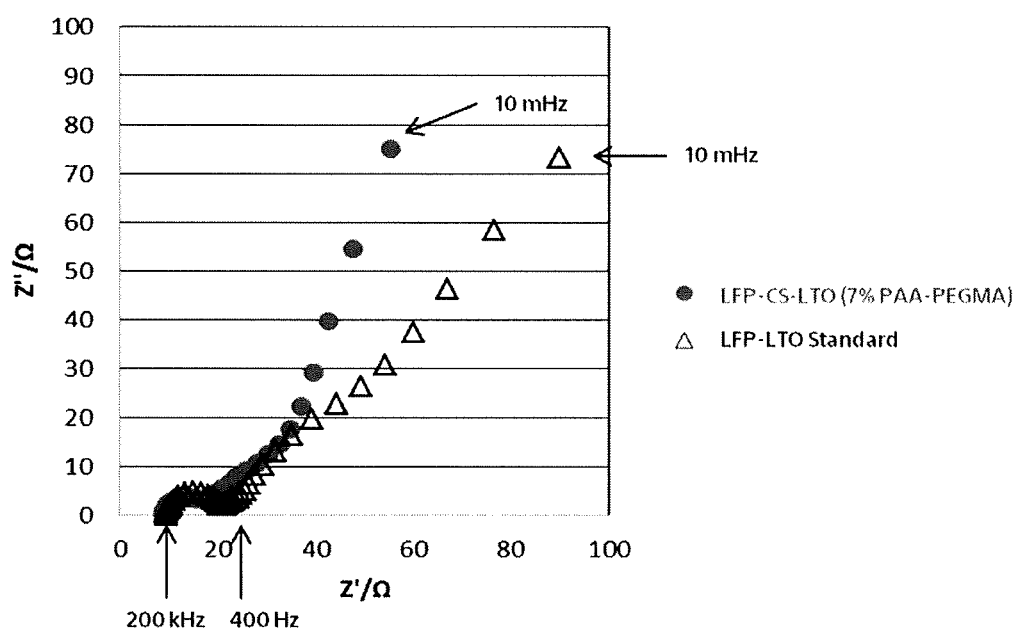
FIG. 8 shows the impedance spectra (Nyquist plot) of an LFP-CS-LTO (7% PAA-PEGMAO cell compared to an LFP-LTO standard cell as described in Example 5.

FIG. 8 shows the impedance spectra (Nyquist plot) of the two cells at −30° C. LFP CS-LTO 7% PEGMA-PAA was showed to have less Rs and Rct than its non-coated version. CS-LTO particles may thus improve the electrochemical performance at low temperature. This resistance reduction helps the charge discharge performance even at severe low temperature condition.

Numerous modifications could be made to any of the embodiments described above without departing from the scope of the present invention. Any references, patents or scientific literature documents referred to in this application are incorporated herein by reference in their entirety for all purposes.

The invention claimed is:

1. An electrode material comprising particles, said particles comprising a core-shell structure wherein:
   the core comprises electrochemically active material particles having a surface comprising hydroxyl groups; and
   the shell comprises a polymer that at least partially covers the surface of the electrochemically active material particles;
   wherein the polymer is grafted directly, without the use of a linker, on the surface of the electrochemically active material particles by one or more covalent bond(s), and
   wherein the polymer contributes between 0.1 wt % to 10 wt % towards the total weight of the particles.

2. The electrode material of claim 1, wherein the polymer is based on monomers polymerizable via radical or ionic polymerization.

3. The electrode material of claim 1, wherein the polymer is based on at least one monomer comprising a halogen group.

4. The electrode material of claim 3, wherein the monomer comprising a halogen group is vinyl benzyl chloride.

5. The electrode material of claim 1, wherein the polymer is based on at least one styrene monomer.

6. The electrode material of claim 1, wherein an additional substituent is partially grafted on the polymer by covalent bonding, said additional substituent improving adhesion of said polymer on said surface of the electrochemically active material.

7. The electrode material of claim 1, wherein the electrochemically active material is selected from:
   LiM'PO$_4$ wherein M' is Fe, Ni, Mn, Co, or a combination thereof, each of which may be further partially replaced by a doping material;
   Li(M'$_{1-c}$A$_c$)$_{1-d}$X$_{1-d}$PO$_4$, M' is as defined above, A is Fe, Ni, Mn, or Co and is different from M', and X is a doping material, and c and d are greater than or equal to 0 and lower that 0.25;
   LiMn$_2$O$_4$, wherein Mn may be partially replaced, LiMn$_{2-a}$M$_a$O$_4$, wherein M, in this instance, is selected from Co and Ni, and a is greater than or equal to 0 and lower that 0.5;
   LiM"O$_2$, wherein M" is Mn, Co, Ni, or a combination thereof, LiCo$_{1-b}$M$_b$O$_2$, wherein M, in this instance, is selected from Mn and Ni, and b is greater than or equal to 0 and lower that 0.25;
   Li(NiM''')O$_2$, wherein M''' is Mn, Co, Al, Fe, Cr, Ti, or Zr, and combinations thereof;
   vanadium oxides, lithium vanadium oxides;
   lithium titanates;
   Li$_4$Ti$_{5-e}$Z$_e$O$_{12}$, wherein Z is a doping element selected from Zr, Ni, Ta, Cr, Co, La, Y, Ru, Mo, Mn, V, Nb, and Sr, and e is greater than or equal to 0 and lower that 1.5;
   carbon selected from graphite (C6), hard carbon, graphene, carbon black, acetylene black, furnace black, and carbon fibers and
   Si, Si—C, SiO$_x$, Sn, SnO$_x$, Si—O—C, or Ti—C.

8. A method for producing the electrode material of claim 1, the method comprising:
   providing an electrochemically active material in the form of microparticles or nanoparticles having a surface comprising hydroxyl groups;
   providing a polymer for grafting on the surface, said polymer comprising leaving groups displaceable by substitution; and
   grafting said polymer on the surface of the particle, wherein the polymer is covalently grafted on the surface.

9. The method of claim 8, further comprising grafting an additional substituent on the polymer before the grafting of said hydrophobic polymer on the surface, for improving adhesion of said hydrophobic polymer on said surface.

10. The method of claim 8, wherein the polymer is selected from the group consisting of poly(styrene-co-vinyl benzyl chloride) and poly(methyl methacrylate-co-vinyl benzyl chloride).

11. The electrode material of claim 1, wherein the polymer is a hydrophobic polymer.

12. The electrode material of claim 11, wherein the hydrophobic polymer is based on at least one monomer selected from styrenes, alkyl acrylates, alkyl methacrylates, and alkyl vinyl ethers.

13. The electrode material of claim 1, wherein the polymer is a hydrophilic polymer.

14. The electrode material of claim 13, wherein the hydrophilic polymer is based on monomers selected from styrenes, alkyl acrylates, alkyl methacrylates, alkyl vinyl ethers, acrylic acid, methacrylic acid, glycols, and combinations thereof.

15. An electrode comprising the electrode material as defined in claim 1 on a current collector.

16. The electrode of claim 15, wherein the electrode material further comprises a conductive agent, a binder, and optionally additives.

17. An electrochemical cell comprising at least one anode, at least one cathode and at least one electrolyte, wherein at least one of the anode and cathode comprises the electrode material as defined in claim 1.

18. The electrochemical cell of claim 17, comprising a cylindrical, pouch, prismatic, or spherical casing.

19. A module or pack comprising an electrochemical cell as defined in claim 17.

20. The electrochemical cell of claim 17,
wherein the polymer is partially substituted with 1,8-diazabicyclo[5.4.0]undec-7-ene (DBU).

21. The electrochemical cell of claim 17, wherein the polymer is selected from the group consisting of poly (methyl methacrylate-co-vinyl benzyl chloride), (poly(n-butyl vinyl ether), poly(nbutyl acrylate), polystyrene, poly (acrylic acid), poly(methacrylic acid), poly(ethylene glycol) ether methyl methacrylate or a co-polymer thereof.

\* \* \* \* \*